United States Patent [19]

Suzuki et al.

[11] Patent Number: 5,044,221
[45] Date of Patent: Sep. 3, 1991

[54] SHIFT LEVER CONTROL DEVICE

[75] Inventors: Toshio Suzuki; Hiroshi Yamazaki, both of Yokohama; Katsunori Shirahama, Atsugi, all of Japan

[73] Assignees: Ohi Seisakusho Co., Ltd.; Nissan Motor Co., Ltd., both of Yokohama, Japan

[21] Appl. No.: 442,559

[22] Filed: Nov. 29, 1989

[30] Foreign Application Priority Data

Nov. 29, 1988 [JP] Japan .............................. 63-155530[U]

[51] Int. Cl.⁵ ........................ F16H 59/02; G05G 5/03; G05G 1/28
[52] U.S. Cl. .................................. 74/475; 74/473 R; 74/527
[58] Field of Search ....................... 74/473 R, 475, 527

[56] References Cited

U.S. PATENT DOCUMENTS 4,365,522 12/1982 Kubota et al. ........................ 74/475
4,531,423 7/1985 Fogelberg ............................ 74/475
4,645,046 2/1987 Takano et al. ..................... 74/475 X

OTHER PUBLICATIONS

Magazine, "Motor Fan", Jan. 1982 Issue, p. 172.

Primary Examiner—Allan D. Herrmann
Attorney, Agent, or Firm—Foley & Lardner

[57] ABSTRACT

A shift lever control device is disclosed. A cranked guide slot is defined along which a shift lever is slidably moved. The guide slot includes at least one elongate part and a shorter terminal part which extends in a given direction perpendicular to the elongate part. The shift lever is pivotal in a universal direction and biased in a direction opposite to the given direction. A pivot latch member is located near a joint portion between the elongate part and the shorter terminal part of the guide slot. The pivot latch member has a guide recess formed therein and is pivotal between a first given position wherein an enclosed space is defined by the shorter terminal part of the cranked guide slot and the guide recess of the pivot latch member and a second given position wherein the guide recess of the latch member is open to the elongate part of the cranked guide slot. A check mechanism is employed for making the pivotal movement of the latch member to the first and second given positions in a snap action manner. The check mechanism includes a cam member secured to the latch member and having a cam surface with rounded depressions, elastomeric members respectively disposed in the rounded depressions, and a detent member held by a stationary member and resiliently pressed against the cam surface of the cam member.

9 Claims, 5 Drawing Sheets

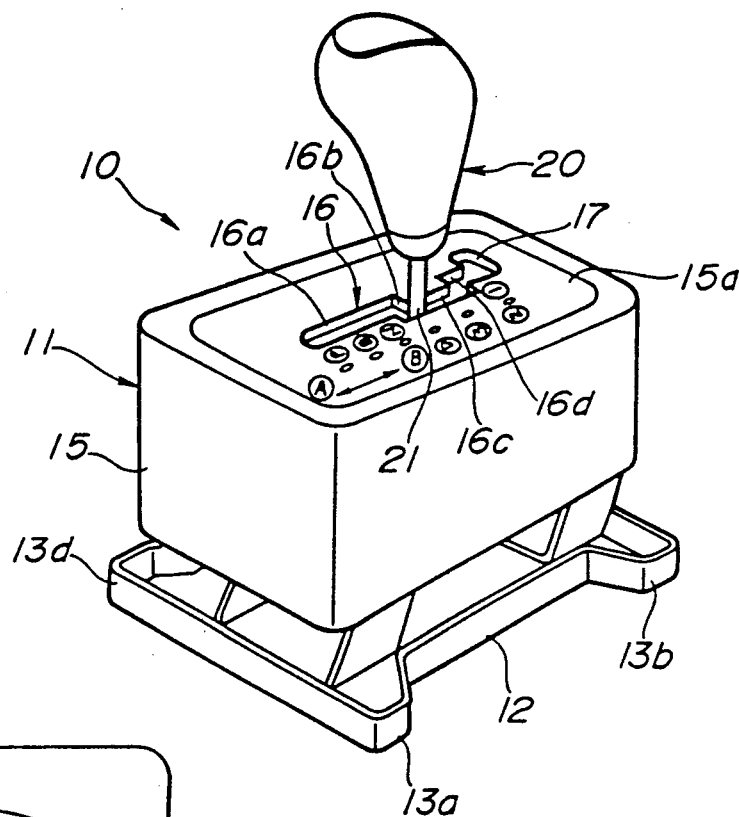
FIG. 3
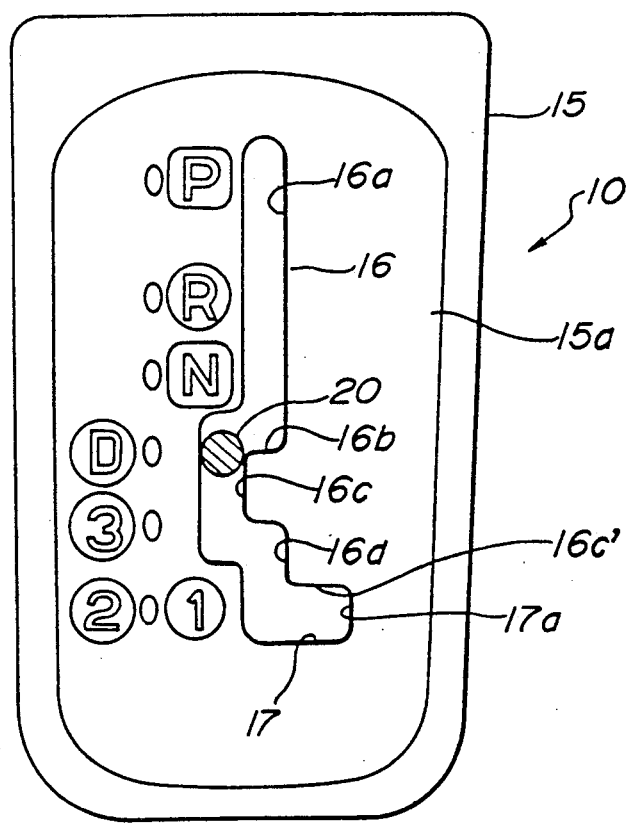

SHIFT LEVER CONTROL DEVICE

BACKGROUND OF THE INVENTION

1. Field of the Invention

The present invention relates to shift lever control devices for use in wheeled motor vehicles of a type having an automatic transmission mounted therein, and more particularly to shift lever control devices of a type which has the shift lever slidably moved in a cranked guide slot.

2. Description of the Prior Art

Among the shift lever control devices for controlling automotive automatic transmissions, there is a type which has the shift lever slidably moved in a cranked guide slot. In the control devices of this type, the shift lever is compelled to travel in a zig-zag manner due to the structural nature of the cranked guide slot.

One of the conventional shift lever control devices of such type is disclosed in Japanese automotive magazine "MOTOR FAN" issued on Jan. 1, 1982.

In order to clarify the task of the present invention, the conventional device disclosed in the magazine will be described with reference to FIG. 8 of the accompanying drawings, which is a schematical and partial plan view of the conventional device, showing an essential section which is relevent to the present invention.

Designated by numeral 2 is a cranked guide slot in and along which a shift lever 1 is slidably moved for the shifting operation. As is shown, the guide slot 2 has a terminal end portion 2a bent perpendicularly. A generally J-shaped shift lever holding member 3 is pivotally connected at one end to a fixed member (not shown) through a pivot shaft 3a. The holding member 3 has at the other end portion a guide recess 4a which has a roundly depressed bottom 4b. As may be understood from the drawing, during the pivotal movement, the holding member 3 can assume a first given position wherein an enclosed space for the shift lever 1 is defined by the terminal bent end portion 2a of the cranked guide slot 2 and the guide recess 4a of the holding member 3.

A spring biased detent roller 5a is connected to a free end of the holding member 3, which is resiliently and selectively engageable with two spaced notches 5b and 5c formed in a fixed member (no numeral). The detent roller 5a and the two notches 5b and 5c thus constitute a so-called "check mechanism" 5 for the holding member 3.

As is seen from the drawing, in a case wherein the holding member 3 assumes the above-mentioned first given position, the detent roller 5a is resiliently engaged with the notch 5b thereby holding the holding member 3 stationary.

When the shift lever 1 is manipulated to move from the terminal bent end portion 2a toward a major part of the guide slot 2, the holding member 3 is pivoted in a clockwise direction in the drawing to a second given position wherein the guide recess 4a is open to the major part of the guide slot 2 having the detent roller 5a resiliently engaged with the other notch 5c. Thus, thereafter, the shift lever 1 is movable in the major part of the guide slot 2 toward the other terminal end thereof.

When thereafter the shift lever 1 in the major part of the guide slot 2 is moved toward the entrance of the terminal bent end portion 2a, the shift lever 1 enters the guide recess 4a of the holding member 3 which has been kept in the second given position. When the shift lever 1 is then shifted into the terminal bent end portion 2a, the holding member 3 is returned to the first given position providing the operator (viz., driver) with a detent feeling.

However, due to its inherent construction, the shift lever control device described hereinabove has the following drawbacks.

First, when the shift lever 1 assumes the first given position as shown in FIG. 8, there is inevitably produced, between the shift lever 1 and one peripheral side (denoted by reference "c") of the terminal bent end portion 2a, a gap which may cause an undesirable play of the shift lever 1. In fact, at the first given position, only the diametrically opposed two portions "a" and "b" of the shift lever 1 are held or pressed by a terminal edge of the bent end portion 2a and one side edge of the guide recess 4a respectively.

Second, because of the nature of the check mechanism 5 employed in the device, there is produced a click metallic noise each time the detent roller 5a falls into the notch 5c or 5b.

SUMMARY OF THE INVENTION

It is therefore an object of the present invention to provide a shift lever control device which is free of the above-mentioned drawbacks.

According to the present invention, there is provided a shift lever control device which comprises first means which defines a cranked guide slot along which a shift lever is slidably moved, the cranked guide slot including at least one elongate part and a shorter terminal part which extends in a given direction perpendicular to the elongate part; second means for permitting the shift lever to pivot in a universal direction; third means for biasing the shift lever in a direction opposite to the given direction; a pivot latch member located near a joint portion between the elongate part and the shorter terminal part of the guide slot, the pivot latch member having two arm portions by and between which a guide recess is defined, the pivot latch member being pivotal between a first given position wherein an enclosed space is defined by the shorter terminal part of the cranked guide slot and the guide recess of the pivot latch member and a second given position wherein the guide recess of the latch member is open to the elongate part of the cranked guide slot; and check means for making the pivotal movement of the latch member to the first and second given positions in a snap action manner, the check means including a cam member secured to the latch member to move therewith and having a cam surface which includes rounded depressions; elastomeric members respectively disposed in the rounded depressions; and a detent member which is held by a stationary member and resiliently pressed against the cam surface of the cam member.

BRIEF DESCRIPTION OF THE DRAWINGS

Other objects and advantages of the present invention will become apparent from the following description taken in conjunction with the accompanying drawings, in which:

FIG. 2 is a perspective view of the shift lever control device;

FIG. 3 is a plan view of the shift lever control device;

DETAILED DESCRIPTION OF THE INVENTION

Figure 1:
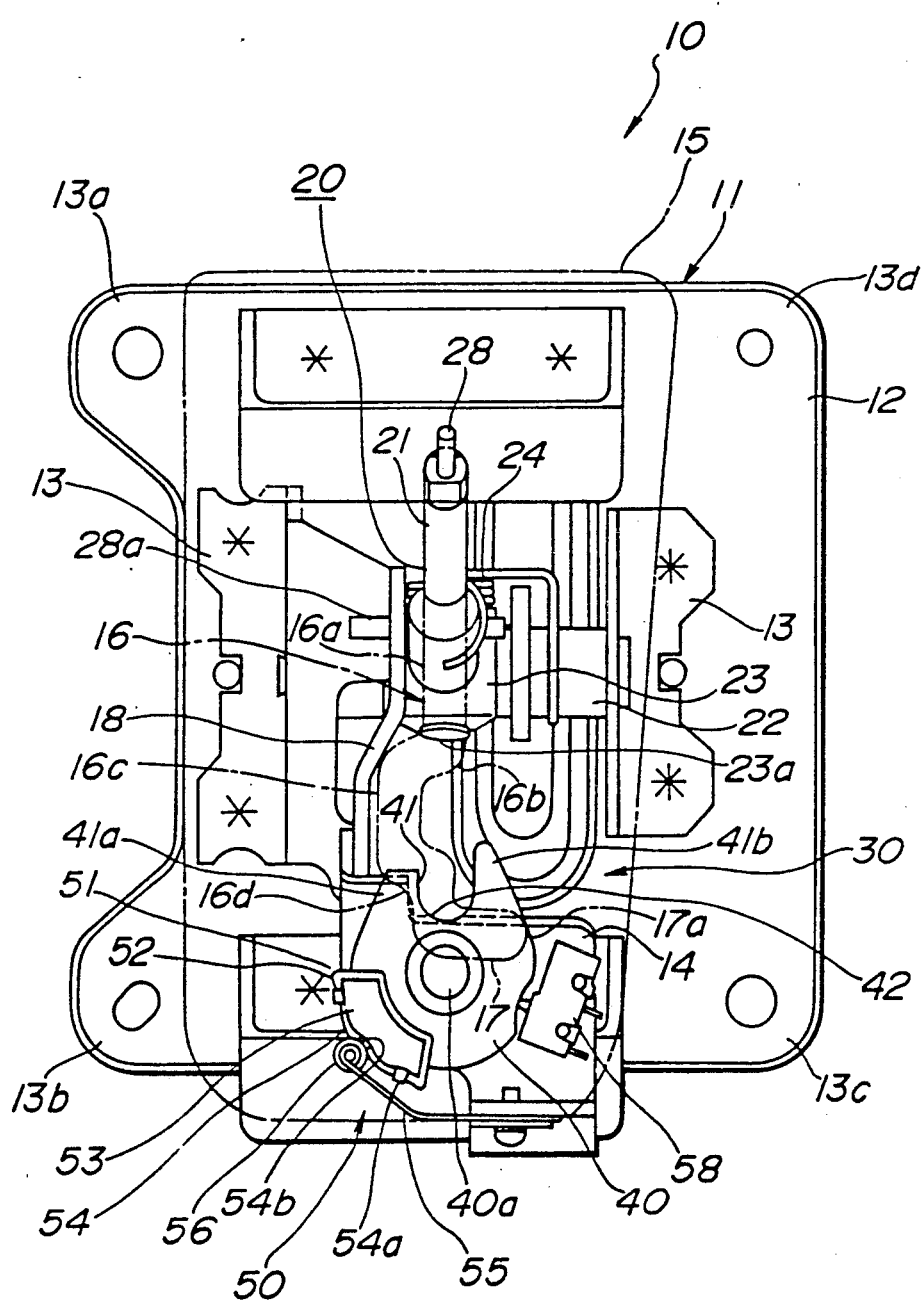
FIG. 1 is a plan view of a shift lever control device of the present invention with some parts removed for clearly showing the interior of the device.

Referring to FIGS. 1 to 7 of the accompanying drawings, there is shown a shift lever control device according to the present invention, which is generally designated by numeral 10.

As is seen from FIG. 2, the device 10 comprises a case assembly 11 which consists of a base portion 12 and a case portion 15. The base portion 12 has four laterally extending leg portions 13a, 13b, 13c and 13d which are to be seated on a floor member (not shown) of a motor vehicle. As will become apparent as the description proceeds, essential parts of the device 10 are all installed in the case portion 15.

The case portion 15 has an integral upper wall 15a which is formed with a cranked guide slot 16. A cylindrical hollow rod portion 21 of a shift lever 20 passes through the guide slot 16 to be guided by it during a shifting operation thereof.

As is best shown in FIG. 3, the guide slot 16 comprises a longer part 16a beside which gear marks P(Park), R(Reverse) and N(Neutral) are provided, a shorter part 16c connected through a normally bent part 16b to the longer part 16a, beside which gear marks D(Drive) and 3(Third) are provided, a very short part 16d connected through a normally bent part 16c' to the shorter part 16c, and a laterally extending shorter part 17 connected to the very short part 16d, at which gear marks 2(Second) and 1(First) are provided. The double-headed arrow "A-B" shown in FIG. 2 shows the direction along which the longer, shorter and the very short parts 16a, 16c and 16d extend. The laterally extending part 17 extends normal to the arrow "A—B".

Figure 4:
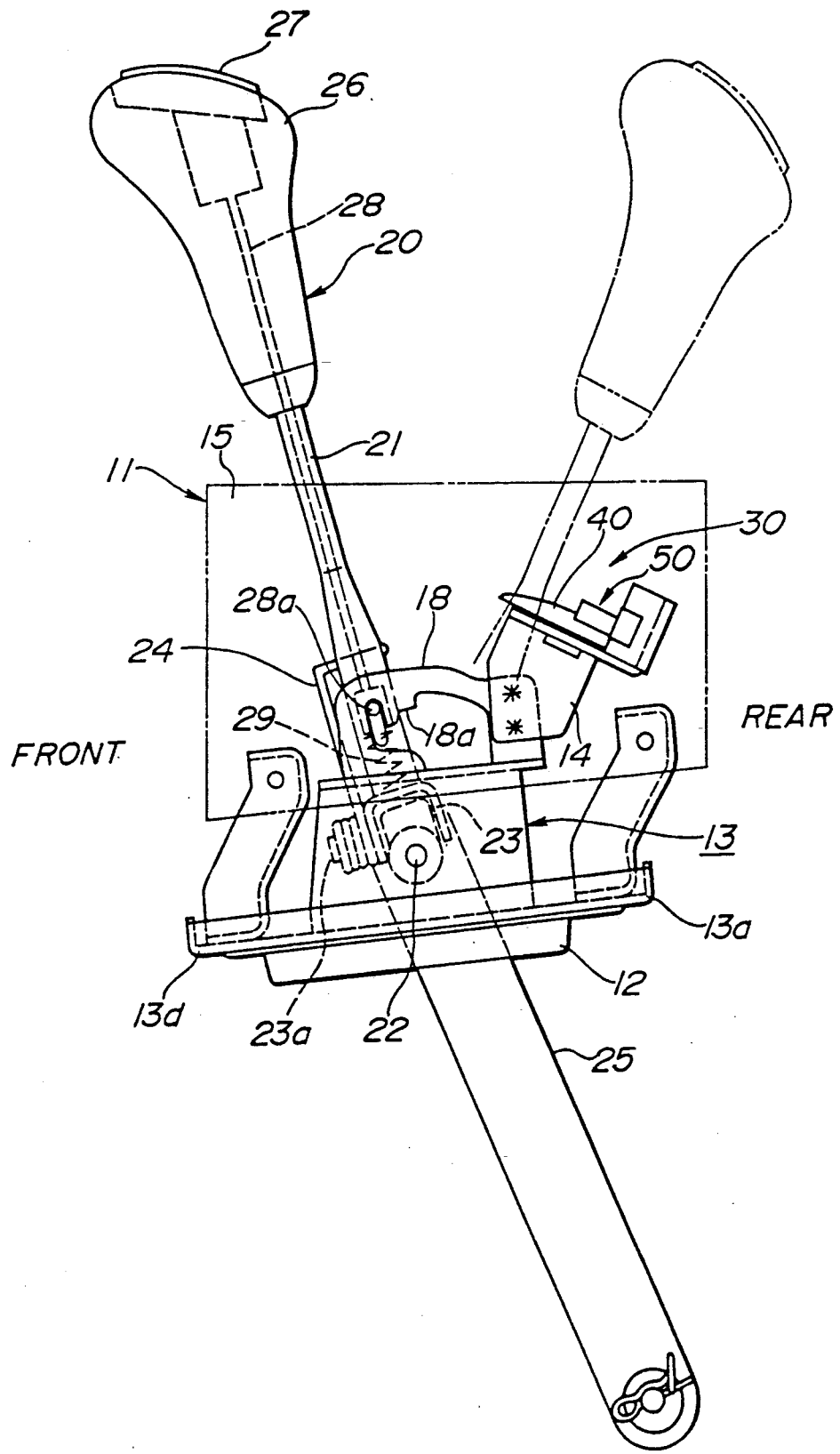
FIG. 4 is a side view of the shift lever control device with some parts removed for clearly showing the interior of the device.

As is shown in FIGS. 1 and 4, spaced upstanding supporting brackets 13 are secured to the base portion 12. A main pivot shaft 22 is rotatably supported by the brackets 13, which extends in a direction normal to the longitudinal axis of the cranked guide slot 16. An upstanding position plate 18 is secured to one of the brackets 13 (see FIG. 1).

As is seen from FIG. 4, the position plate 18 has an aperture whose upper periphery constitutes a check cam surface 18a.

A coupling bracket 23 is pivotally connected to the main pivot shaft 22 through a shaft 23a which extends normal to the axis of the shaft 22. The hollow rod portion 21 of the shift lever 20 is secured at its lower base end to the coupling bracket 23. Thus, the main pivot shaft 22, the shaft 23a and the coupling bracket 23 constitute a so-called "universal joint". The shift lever 20 is thus permitted to pivot longitudinally and laterally relative to the fixed supporting brackets 13.

The shaft 23a has a coil spring 24 disposed thereabout. With this coil spring 24, the shift lever 20 is biased laterally, that is, leftward in FIG. 3. A connecting lever 25 (see FIG. 4) extending from an automatic transmission (not shown) is secured to the coupling bracket 23 to move therewith.

A knob 26 is mounted to a top of the shift lever 20. The knob 26 supports thereon a push button 27 from which a cancel rod 28 extends toward the lower base end of the hollow rod portion 21. As is seen from FIG. 1, the cancel rod 28 passes through the hollow rod portion 21.

A check pin 28a, which is operatively engageable with the check cam surface 18a of the position plate 18, is mounted to a lower end of the cancel rod 28. A spring 29 is arranged to bias the cancel rod 28 in a direction to press the check pin 28a against the check cam surface 18a of the position plate 18.

A holding bracket 14 is secured to the position plate 18. As will be understood from FIG. 1, the holding bracket 14 is located near the laterally extending shorter part 17 of the cranked guide slot 16 and mounts thereon a lever holding device 30 which will be described in the following.

Figure 5:
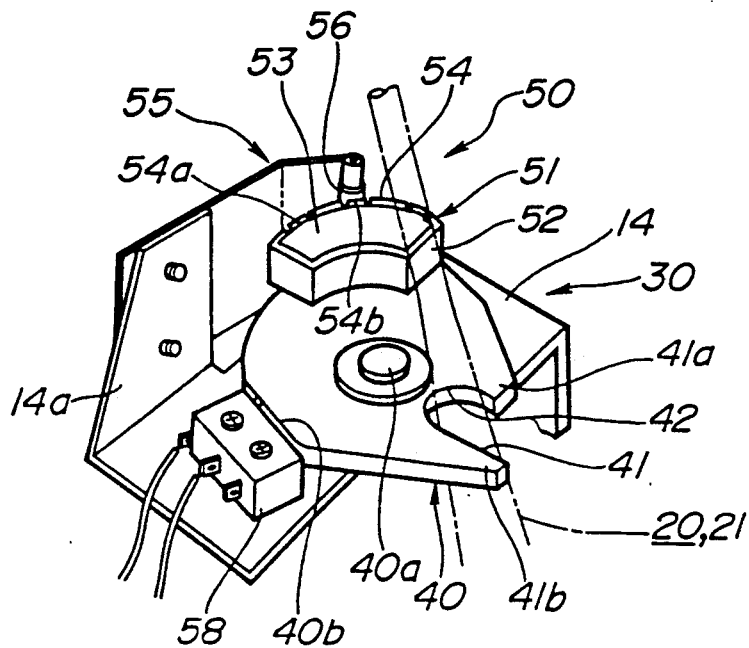
FIG. 5 is a perspective view of a check mechanism employed in the shift lever control device of the invention.

As will be seen from FIGS. 1 and 5, the lever holding device 30 comprises a generally circular latch member 40 which is rotatably connected through a pivot pin 40a to the holding bracket 14 and a check mechanism 50 which permits the latch member 40 to turn to given positions in a snap action manner.

As is seen from FIG. 5, the latch member 40 is formed with two guide arms 41a and 41b by and between which a rounded guide recess 41 is defined. The bottom 42 of the guide recess 41 is shaped to match with the shift lever 20.

Figure 6:
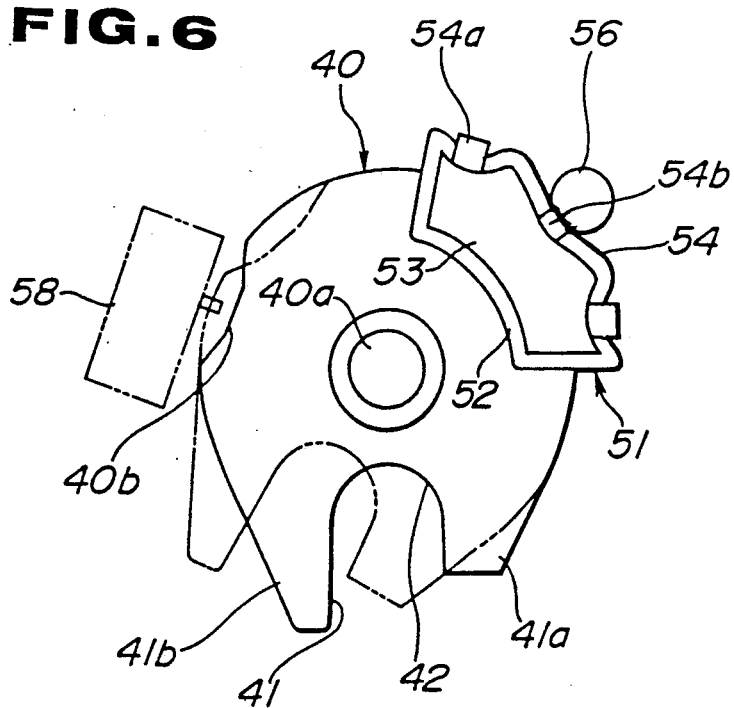
FIG. 6 is a plan view of the check mechanism showing two conditions of the same.

As will be understood from FIGS. 1 and 6, the latch member 40 is pivotal between a first given position wherein, as is shown by a phantom line in FIG. 6, an enclosed space is defined by the laterally extending shorter part 17 of the guide slot 16 and the rounded guide recess 41 of the latch member 40 and a second given position wherein, as is shown by a solid line in FIG. 6, the rounded guide recess 41 of the latch member 40 is open to the very short part 16d of the guide slot 16. As is seen from FIG. 7, when the latch member 40 assumes the first given position, the shift lever 20 is arrested by the latch member 40, while when the latch member 40 assumes the second given position, the shift lever 20 is permitted to escape from the latch member 40 to the major part of the guide slot 16.

As is seen from FIG. 5, the check mechanism 50 comprises generally an arcuate cam member 51 secured to the latch member 40 and a resiliently pressing member 55 fixed to the holding bracket 14.

The arcuate cam member 51 comprises an arcuate plastic casing 52 and an elastomeric member 53 plugged in the casing 52. As shown, the arcuate cam member 51 is arranged on a peripheral part of the latch member 40 and has a cam surface 54 which includes rounded depressions 54a and 54b. Each depression has a slit through which parts 53a and 53b elastomeric member 53 is projected radially outwardly.

The resiliently pressing member 55 is of a flat spring, which has a base portion secured to an upstanding part 14a of the holding bracket 14. The pressing member 55 has at its leading end a roller 56 which is pressed against the cam surface 54 of the arcuate cam member 51.

As is best seen from FIG. 5, a position detecting switch 58 is mounted on the holding bracket 14, which is designed to turn ON when the latch member 40 assumes the first given position. For this ON-OFF operation, the latch member 40 is formed with a depression 40b (see FIG. 6) into which a detector pin 58a of the switch 58 is projectable.

In the following, operation will be described.

For ease of understanding, the description will be commenced with respect to a condition wherein the shift lever 20 assumes the PARK position as is illustrated by a solid line in FIG. 4. Under this condition, the check pin 28a of the cancel rod 28 is latchingly engaged with a notch of the check cam surface 18a of the position plate 18, and the latch member 40 assumes the second given position having the rounded depression 54b of the arcuate cam member 51 operatively engaged with the spring biased roller 56.

When the push button 27 is pushed and the shift lever 20 is pulled rearward with the push button 27 kept pushed, the shift lever 20 is permitted to move toward the normally bent part 16b of the guide slot 16 (see FIG. 3). Since the shift lever 20 is designed to pivot laterally as well as longitudinally, the shift lever 20 is permitted to move leftward as viewed in FIG. 3 from the bent part 16b to the shorter part 16c of the guide slot 16 when applied with a suitable force. Thus, thereafter, the shift lever 20 is movable toward the laterally extending shorter part 17.

During this zig-zag shifting movement of the shift lever 20, the check pin 28a travels on and along the check cam surface 18a of the position plate 18. Thus, an operator, viz., a driver, can locate the shift lever 20 to a desired gear position while being given a detent feeling provided by the check pin 28a which is pressed against the check cam surface 18a.

Due to provision of the coil spring 24, the shift lever 20 is biased laterally, that is, leftward in FIG. 3. Thus, the shift lever 20 assuming the PARK, REVERSE, NEUTRAL, DRIVE, THIRD OR SECOND gear position can be stationarily held without play.

When now the shift lever 20 is moved from the very short part 16d of the guide slot 16 to the entrance of the laterally extending shorter part 17 of the same, the shift lever 20 enters the rounded guide recess 41 of the latch member 40 as is shown in FIG. 5. Under this, the SECOND gear position is assumed by the shift lever 20.

When then the shift lever 20 is forced rightward in FIG. 3, the same is moved rightward in the laterally extending shorter part 17 to a terminal end 17a of the same. During this movement, the latch member 40 is turned rightward to the first given position as shown in FIG. 7 causing the spring biased roller 56 to get out the center rounded depression 54b and fall into the other rounded depression 54a.

Figure 7:
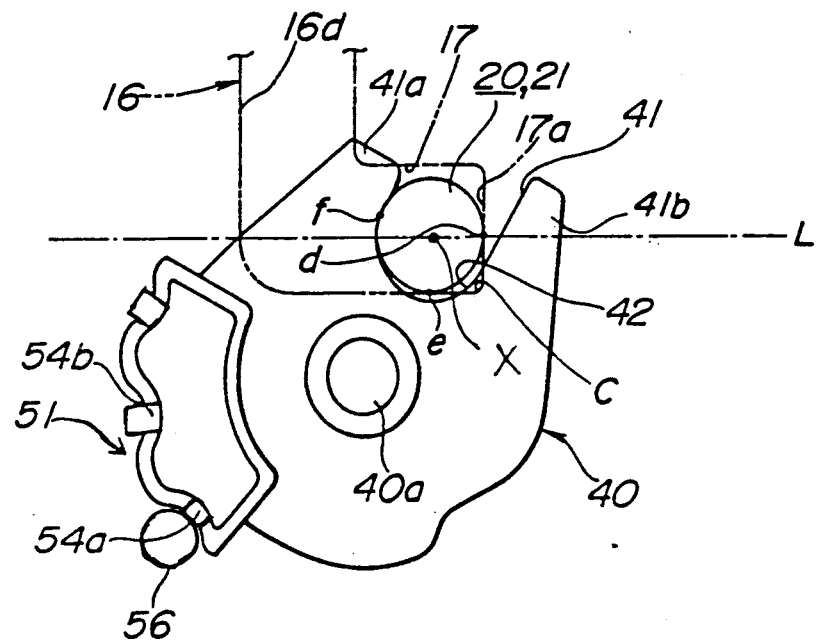
FIG. 7 is a view similar to FIG. 6, but showing a condition wherein a shift lever is restrained by the check mechanism.
Figure 8:
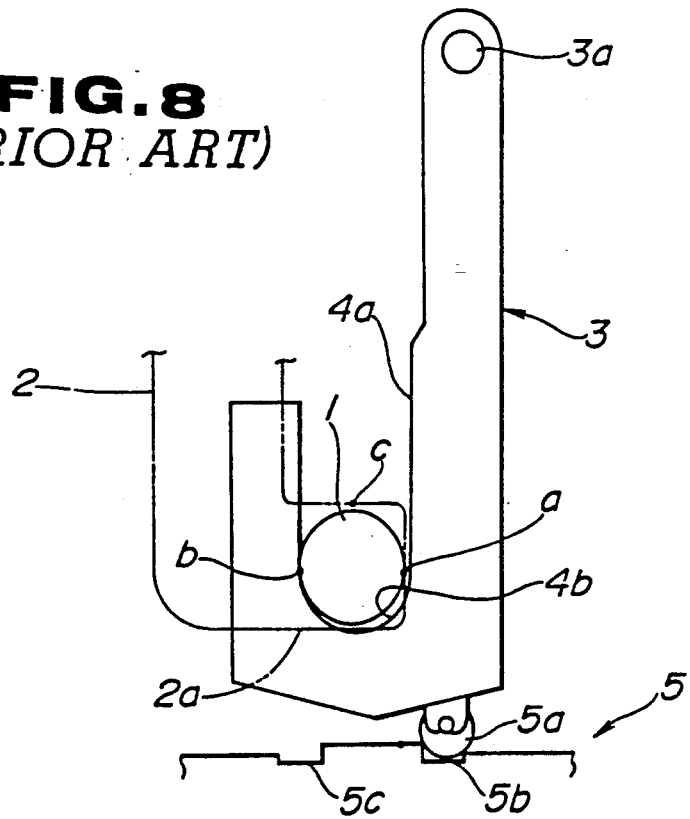
FIG. 8 is a schematical and partial plan view of a conventional shift lever control device.

Under this condition, the spring biased roller 56 biases the latch member 40 in a clockwise direction in FIG. 7 and thus the shift lever 20 is pressed against the terminal end 17a of the shorter guide slot part 17 by the guide recess bottom 42 of the latch member 40.

As is seen from FIG. 7, when the shift lever 20 assumes this FIRST gear position, the same, more specifically, the hollow rod portion 21, is held by three portions "d", "e" and "f" which are the portion "d" of the terminal end 17a to which the rod portion 21 contacts, the portion "e" of one side edge of the shorter guide slot part 17 to which the rod portion 21 contacts and the portion "f" of the guide arm 41a of the latch member 40 to which the rod portion 21 contacts. It is to be noted that in the present invention, the three portions "d", "e" and "f" are arranged to sufficiently enclose the rod portion 21 to eliminate play of the same in any direction. That is, under the FIRST gear position, the guide arm 41a of the latch member 40 presses the rod portion 21 toward the corner "C" of the shorter guide slot part 17. More specifically, when the shift lever 20 assumes the FIRST gear position contacting the peripheral edge of the slot 17 at the portions "d" and "e", the portion "f" is located in a zone which is opposite to another zone where the portion "e" is located with respect to an imaginary straight line "L" which passes through both the portion "d" and the central axis "X" of the shift lever 20.

In the following, advantages of the present invention will be described with reference to FIGS. 6 and 7.

First, since the rod portion 21 assuming the FIRST gear position is held by the three points as is described hereinabove, the shift lever 20 is stationarily held without play.

Second, since the rounded depressions 54a and 54b have a part of the elastomeric member 53 provided thereon, the engagement of the spring biased roller 56 to the depressions 54a and 54b does not produce the undesirable noise. For the same reason, the arm portion 41a of the latch member 40 can press or bias the rod portion 21 in the desired direction "C" when the shift lever 20 assumes the FIRST gear position.

What is claimed is:

1. A shift lever control device comprising:
   first means which defines a cranked guide slot along which a shift lever is slidably moved, said cranked guide slot including at least one elongate part and a shorter terminal part which extends in a given direction perpendicular to said elongate part;
   second means for permitting said shift lever to pivot in a universal direction;
   third means for biasing said shift lever in a direction opposite to said given direction;
   a pivot latch member located near a joint portion between said elongate part and said shorter terminal part of said guide slot, said pivot latch member having two arm portions by and between which a guide recess is defined, said pivot latch member being pivotal between a first given position wherein an enclosed space is defined by said shorter terminal part of said cranked guide slot and said guide recess of the pivot latch member and a second given position wherein said guide recess of the latch member is open to said elongate part of said cranked guide slot; and
   check means for making the pivotal movement of said latch member to said first and second given positions in a snap action manner, said check means including a cam member secured to said latch member to move therewith and having a cam surface which includes rounded depressions; elastomeric members respectively disposed in said rounded depressions; and a detent member which is held by a stationary member and resiliently pressed against said cam surface of said cam member.

2. A shift lever control device as claimed in claim 1, in which said enclosed space defined by said shorter terminal part of said cranked guide slot and said guide recess of the pivot latch member is so sized as to hold said shift lever at three portions.

3. A shift lever control device as claimed in claim 2, in which said shift lever is of a cylindrical member and said guide recess of said latch member has a rounded bottom.

4. A shift lever control device as claimed in claim 3, in which said three portions are arranged to sufficiently enclose a cylindrical shift lever.

5. A shift lever control device as claimed in claim 4, in which when said shift lever is received in said enclosed space while contacting with two of said three portions, the remaining one of said three portions is located in a zone which is opposite to another zone where one of said two portions is located with respect to an imaginary straight line which passes through both the other of said two portions and the central axis of said shift lever.

6. A shift lever control device as claimed in claim 1, in which said elastomeric members of said check means are parts of an elastomeric block which is plugged in said cam member which is of a hollow member, said parts being projected radially outwardly through openings formed in said rounded depressions.

7. A shift lever control device as claimed in claim 6, in which said detent member comprises:
   a flat spring having one end secured to said stationary member; and
   a roller rotatably connected on a leading end of said flat spring and pressed against said cam surface of said cam member.

8. A shift lever control device as claimed in claim 1, further comprising a position detecting switch which is mounted on said stationary member and designed to turn ON when said latch member assumes said first given position.

9. A shift lever control device as claimed in claim 8, in which said position detecting switch comprises a detector pin which is projectable into a depression formed in said latch member.

* * * * *